United States Patent
Preito Santiago (10) Patent No.: US 6,590,300 B1
(45) Date of Patent: Jul. 8, 2003

(54) CYCLONIC OR ANTI-CYCLONIC CONVERSION TOWER

(75) Inventor: Francisco Javier Preito Santiago, Algete (ES)

(73) Assignee: Tryp Multiserv Servicios, S.L. (ES)

( * ) Notice: Subject to any disclaimer, the term of this patent is extended or adjusted under 35 U.S.C. 154(b) by 0 days.

(21) Appl. No.: 09/979,604

(22) PCT Filed: May 19, 2000

(86) PCT No.: PCT/ES00/00184

§ 371 (c)(1),
(2), (4) Date: Nov. 16, 2001

(87) PCT Pub. No.: WO00/71893

PCT Pub. Date: Nov. 30, 2000

(30) Foreign Application Priority Data

May 20, 1999 (ES) ................................................ 9901093

(51) Int. Cl.[7] ................................................ F03D 9/00
(52) U.S. Cl. ...................... 290/55; 290/44; 60/641.11
(58) Field of Search .............................. 290/44, 45, 54, 290/55; 60/398, 641.11, 641.12

(56) References Cited

U.S. PATENT DOCUMENTS

| | | | | |
|---|---|---|---|---|
| 3,788,385 A | * | 1/1974 | Delahunty | 165/104.13 |
| 3,936,652 A | * | 2/1976 | Levine | 290/2 |
| 4,031,173 A | * | 6/1977 | Rogers | 261/24 |
| 4,433,544 A | * | 2/1984 | Wells et al. | 60/641.12 |
| 4,452,046 A | * | 6/1984 | Valentin | 60/641.11 |
| 4,508,973 A | * | 4/1985 | Payne | 290/55 |
| 4,945,693 A | * | 8/1990 | Cooley | 52/80.1 |
| 5,300,817 A | * | 4/1994 | Baird | 290/55 |
| 6,215,199 B1 | * | 4/2001 | Lysenko et al. | 290/44 |
| 6,510,687 B1 | * | 1/2003 | Zaslavsky et al. | 60/398 |

* cited by examiner

*Primary Examiner*—Nicholas Ponomarenko
(74) *Attorney, Agent, or Firm*—Galgano & Burke (57) ABSTRACT

A cyclonic or anti-cyclonic conversion tower which consists of a central vortical duct (1), and at least one convector made up of two vertical membranes or screens (2) and (3), generated by a curve and which are limited at one of their sides by the central vortical duct (1), and at least tow stiffeners (4) and (5) per convector, there being a blocking device (6) per convector, a diffuser (23), a deflector (24), and means for converting kinetic energy into electrical or mechanical energy, the blocking devices (6) having the shape of a guiding crown and can turn on the outer circumference of the central vortical duct (1), the general context adopting the shape of a cylinder or a cylinder ending in an inverted cone trunk.

27 Claims, 12 Drawing Sheets

CYCLONIC OR ANTI-CYCLONIC CONVERSION TOWER

OBJECT OF THE INVENTION

The present specification refers to a cyclonic or anti-cyclonic conversion tower, whose purpose is to be used as a tower with the capacity for obtaining electrical energy from the same.

FIELD OF THE INVENTION

The application of this invention is within the industry which manufactures apparatus, devices and elements for the transformation of energy from different origins into electrical energy.

BACKGROUND OF THE INVENTION

Cyclonic or anti-cyclonic conversion towers are systems which artificially reproduce confined turbulent flows, called vortices, which may be ascending or descending, from laminar wind flows. Inside the tower the different environmental energies can be integrated, that is kinetic wind energy, baric energy due to differences in atmospheric pressure at different levels of the atmosphere, convective thermal energy, and also thermal energy from condensation.

Conventional cyclonic or anti-cyclonic towers are largely made up of a hollow central conduit, called a vortical duct from which, almost tangentially, two or more membranes, screens or vertical structures emerge, whose generatrices have a curved profile with an aerodynamic cross-section.

Two of said membranes or screens, associated with the corresponding section of the central vortical duct, constitute a convector.

As a general rule, there are usually five convectors per level, when they can be orientated in all directions. It must be pointed out that two of these membranes or screens of each convector are supported by means of stiffeners, which are horizontal plates with an aerodynamic cross-section.

At the beginning of the convectors of the vortical duct, the blocking devices are placed, which allow the windward entry of the laminar outer flow but not the exit of flow from the vortical duct to the outside to leeward.

In the upper part of the cyclonic converter there is the diffuser, which prevents the effect of shearing on the exit vortex caused by the flow of laminar air outside the tower, and in the lower part of the converter the deflector is situated, which prevents the depression created by the absorption of the vortical flow.

Normally, at the base and at the upper part of the tower, the aero-turbines, contra-rotatory or not, are placed with the electrical generator, water pump, compressor or any element capable of generating energy, and optionally a hothouse may be added or devices for heating the air and evaporating water, with control of the thermal conditions, including a base in the form of a shallow pool of water in order to heat the air and attempt to saturate it with water vapour, either from the hothouse itself or from one or several hydric hothouses.

A cyclonic or anti-cyclonic conversion tower with the features indicated above is disclosed in Spanish Invention Patent number 493,713.

However, these cyclonic or anti-cyclonic conversion towers have a number of mechanical and cost drawbacks, arising to a great extent from the construction of conventional blocking devices.

As may be observed in Spanish Invention Patent number 493,713, the blocking devices are movable screens with an aerodynamic profile which rest upon damping arms which turn around their support on one of the membranes or screens of the convector, in such a way that the blocking devices open when they are in a convector which must allow the passage of the exterior fluid or flow to the vortical duct, and close when the fluid or flow attempts to leave the central vortical duct outwards.

A first problem consists of the reduction in the performance of the vortex, and even the destruction of the same due to the partial penetration of the blocking device into the vortical duct.

Moreover, and secondly, the great stresses in the supporting points of the arms which hold the blocking devices, in the membranes or screens of the convectors and in the blocking devices themselves, involve a considerable difficulty for construction.

Bear in mind, for example, that for a 100 Mw conversion tower, each blocking device would consist of screens of 70 m long by 3 m high, which holding and moving involve enormous stresses on the supporting points of the holding arms.

This problem is further aggravated by the fact that sudden variations in wind speed or direction will increase the stresses, and as a result of these stresses, the shock absorbers and ball-and-socket joints of the holding arms and the blocking devices themselves undergo great wear, and in practice the materials and technology to make them at an acceptable cost are not known.

Accordingly, the construction of these conversion towers requires special alloys of high rigidity but at the same time very light, which considerably increases the cost of said conversion towers.

Moreover, their maintenance is highly expensive and risky, requiring a large number of skilled personnel. At the same time, the high construction and maintenance costs as well as the limited performance caused by a vortex which is defective as a consequence of the partial introduction of the blocking devices in the central vortical duct, prevent the massive use of conversion towers for energy generation.

The applicant is not aware that at the present time any element such as those mentioned above has been built.

DESCRIPTION OF THE INVENTION

In a first embodiment, the cyclonic or anti-cyclonic conversion tower which is the object of the invention is comprised by a central vortical duct, at least one convector or several made up of two vertical membranes or screens, generated by a curve and which are limited at one of their sides by the central vortical duct, and at least two stiffeners per convector, a blocking device in the form of one guiding crown per convector, a diffuser, a deflector, and means for converting kinetic energy into electrical or mechanical energy. A blocking device can turn on the outer circumference of the central vortical duct, supported on the lower plane and anchored at the upper part of the stiffeners of the convectors.

Preferably, one, several or all the blocking devices which can turn on the outer circumference of the central vortical duct, do so supported and anchored at the upper and lower part of the stiffeners on streamlined rails and with rolling or sliding elements.

More preferably, one, several or all the blocking devices which can turn on the outer circumference of the central vortical duct, do so under the action of the peripheral vortical flow by means of one or more retractable ailerons on the blocking device and servomotorised, or by means of a motorised mechanism of the blocking device itself.

Even more preferably, the number of blocking devices is two, three, four or five.

Also, the invention envisages that one, several or all the blocking devices may or may not turn on the outer circumference of the central vortical duct, being provided with leeward stimulators consisting of vertical slots which open as a result of the depression produced in the blocking devices to leeward.

Still more preferably, inside said cyclonic or anti-cyclonic conversion tower there are sensors for the appropriate controlling, regulating and positioning of one, several or all the blocking devices which can turn on the outer circumference of the central vortical duct, as well as sensors for the advanced detection of strength and direction of wind flows, situated radially at different heights and at symmetrical and appropriate distances on the outside of the cyclonic or anti-cyclonic conversion tower.

Also preferably, the means for converting kinetic energy into electrical or mechanical energy consist of an aero-turbine, contra-rotatory or not, provided with control elements for its blades, for the total or partial opening or closing of its diaphragmatic blocking device and for the exhaust of the same, and also a generator.

Preferably, likewise, there are elements of control and regulation of the flows of the vortex and, optionally, the first embodiment of the cyclonic or anti-cyclonic conversion tower of the present invention also comprises a base in the form of a tank of hot water and saturated air, as well as at least one hydric hothouse, outside the base, from which said hot water and said saturated air come, and more preferably, one or more sensors in each hydric hothouse which detect the humidity and air saturation degree.

In a second embodiment, the cyclonic or anti-cyclonic conversion tower of the present invention comprises a central vortical duct, and at least one convector made up of two vertical membranes or screens, generated by a curve and which are limited at one of their sides by the central vortical duct, as well as at least two stiffeners per convector, one blocking device per convector which rests on damping arms which turn around their support on one of the membranes or screens of the convector, a diffuser, a deflector, and means for converting kinetic energy into electrical or mechanical energy. One, several or all of the blocking devices are provided with leeward stimulators which consist of vertical slots which open as a result of the depression produced in the blocking devices to leeward.

The second embodiment of this invention corresponding to a cyclonic or anti-cyclonic conversion tower may have preferably two, three, four or five blocking devices at each level.

In a third embodiment, the cyclonic or anti-cyclonic conversion tower of the present invention comprises a central vortical duct and at least one convector made up of two vertical membranes or screens, generated by a curve and are limited at one of their sides by the central vortical duct, having at least two stiffeners per convector, one blocking device per convector, a diffuser, a deflector, and means for converting kinetic energy into electrical or mechanical energy, in which at least one blocking device consists of several narrow and vertical slats situated all around the outer perimeter of the vortical duct, in relation to the corresponding convector.

More preferably, in this third embodiment of the cyclonic or anti-cyclonic conversion tower of the invention, one, several or all the vertical slats are aerodynamic.

Even more preferably, in this third embodiment of the cyclonic or anti-cyclonic conversion tower of the invention, the vertical slats open under the action of the flow, or by means of motorised mechanisms fixed in the upper and/or lower part of the corresponding blocking device.

Also preferably, the number of vertical slats of each blocking device in this third embodiment of the cyclonic or anti-cyclonic conversion tower of the invention depends on the strength of the tower and they are all around the perimeter of the outer vortical duct.

In this third embodiment, the cyclonic or anti-cyclonic conversion tower may preferably have sensors inside the conversion tower for appropriately controlling, regulating and positioning one, several or all the vertical slats of the blocking devices corresponding to the convectors, as well as sensors for the advanced detection of the strength and direction of wind flows, situated radially and equidistant at different levels and appropriate distances on the outside of the conversion tower.

Also preferably, in this third embodiment of the conversion tower of the invention, the means for converting electrical or mechanical energy consist of an aero-turbine, contra-rotatory or not, provided with elements for controlling its blades, the total or partial opening or closing of its diaphragmatic blocking device and the exhaust of the same, as well as one or several generators.

Also preferably, there are control and regulation elements of the vortical flow.

Optionally, the third embodiment of the cyclonic-anti-cyclonic conversion tower of the invention also comprises a base in the form of a shallow tank of hot water and saturated air, as well as at least one hydric hothouse, outside the base, from which said hot water and said saturated air come, and more preferably, one or more sensors in each hydric hothouse which detect the degree of humidity and saturation of the air with water vapour.

In a fourth embodiment, the cyclonic or anti-cyclonic conversion tower is carried out on the basis of the construction of a tower made of reinforced concrete, provided with all the elements required for its operation, which has a hollow central area. At a determinate height, a gradual or growing increase begins in the diameter of the tower, which results in the configuration of a tower with a cylindrical lower area and an upper area similar to the trunk of an inverted cone.

The invention also incorporates the relevant articulations on the convectors which in co-operation with the blocking devices of the area determined as a guiding crown, and the area corresponding to the inverted trunco-conical shape, are parts which are anchored to tracks perimetrically positioned on the body of the tower, acting as rails where these mobile parts are anchored, which are gradually opened and closed according to the effect of the wind and in accordance with the creation of the vortex.

The articulation of these parts of the convectors, five of which act together, situated perimetrically, generates the expansion of the vortical duct and consequently multiplies the effectiveness of the invention.

It must be specifically indicated that the blocking devices situated on the perimeter of the vortical duct which adopts the shape of a cylinder, logically have a curvature in accordance with the guiding crown, while those situated on the outer perimeter of the vortical duct in the area which adopts the inverted trunco-conical shape, will have a shape appropriate to carry out their function in a similar way to those situated in the cylindrical area, specifically adopting the surface shape of a split trunk-cone.

It must be reiterated that the blocking devices which have the shape of a guiding crown and also those situated on the perimeter of the trunco-conical guiding crown, each have an angle of 72°, obtained as a result of dividing the 360° of a circle into five identical areas which close the perimeter.

The invention is enhanced by wheels which are incorporated in the rails and consequently have a channelled shape, the steel tracks being fixed to the reinforced concrete and having inner reinforcements, both in the lower and in the upper part, and improved by a servomotor.

DESCRIPTION OF THE DRAWINGS

To complement the description being given and in order to promote a fuller understanding of the features of the invention, a set of drawings accompanies the present specification as an integral part of the same, in which, illustratively and non-restrictively, the following is represented.

PREFERRED EMBODIMENTS OF THE INVENTION

Figure 1:
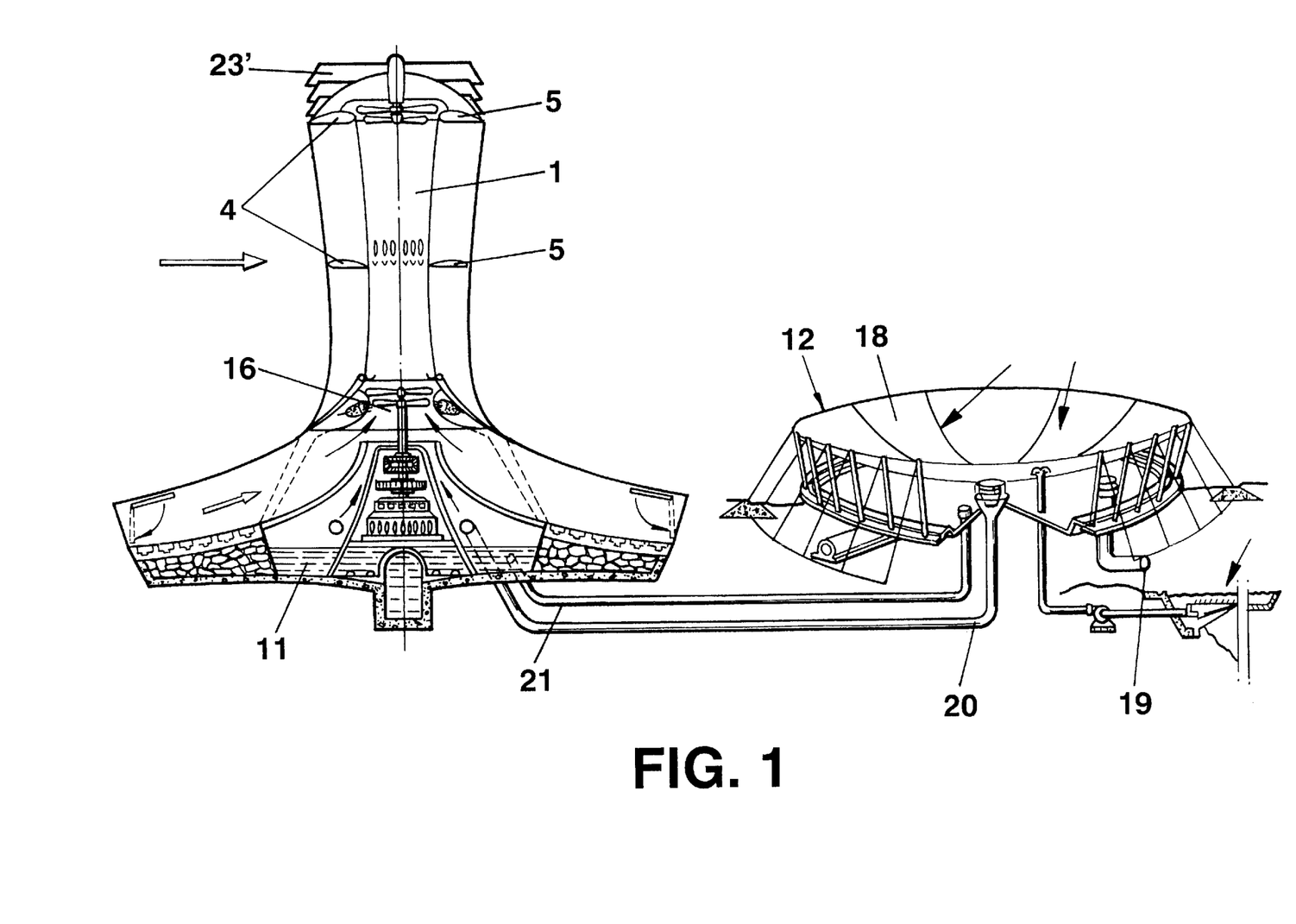
FIG. 1. Corresponds to a diagrammatic view of a conventional cyclonic or anti-cyclonic conversion tower.

A conventional cyclonic or anti-cyclonic conversion tower, such as that represented in FIG. 1, comprises a central vortical duct (1), at least one convector made up of two vertical membranes or screens (2) and (3), generated by a curve and limited on one of its sides by the central vortical duct (1), with at least two stiffeners per convector. It must be taken into account that in FIG. 1 two stiffeners (4) and (5) are shown, which consist of a flat horizontal plate which extends between the membranes or screens (2) and (3), allowing it to be held and kept in position. There is also one blocking device (6) per convector, and a diffuser (23), a deflector (24), and means for converting kinetic energy into electrical energy, such as, for example, aero-turbines, contra-rotating or not, connected to generators (such as those which may be observed in FIG. 9, to which reference will be made hereinbelow).

A construction of this type may be seen in Spanish Patent of Invention number 493,713, which is incorporated in the present specification by way of reference.

The object of the blocking devices (6) is to allow the passage of fluid from the convectors to the central vortical duct (1), according to the orientation of the wind, while preventing on the other hand the passage of fluid from inside the central vortical duct to the convectors when the vortex has already been created.

Figure 2:
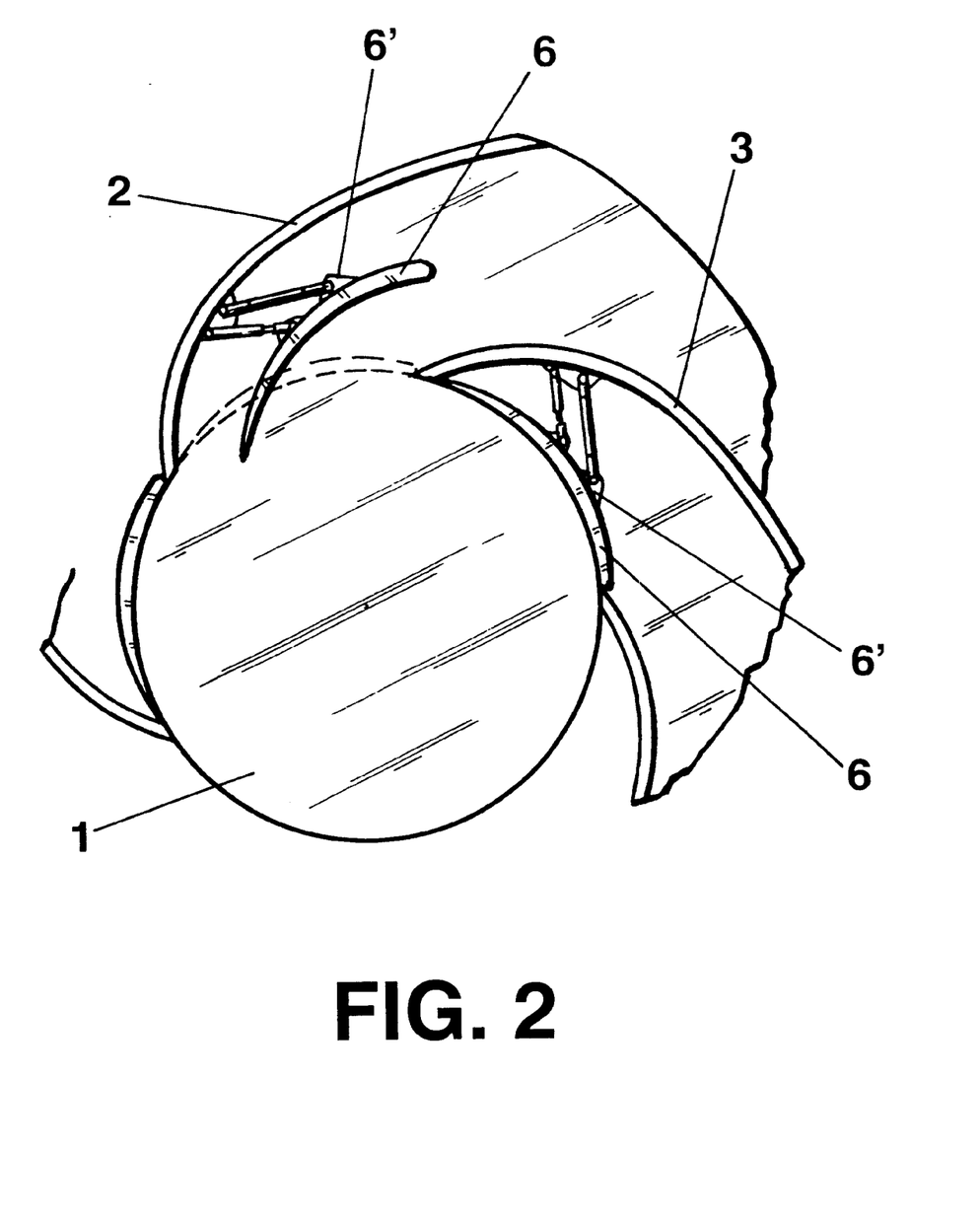
FIG. 2. Shows a view in cross-section of a conventional cyclonic or anti-cyclonic conversion tower, similar to that represented in FIG. 1, showing a conventional blocking device.

FIG. 2 represents a cross-section of a conventional cyclonic or anti-cyclonic conversion tower, in which one can see the central vortical duct (1), the membranes or screens (2) and (3), and also the blocking devices (6).

As may be observed, the blocking devices (6), which have an aerodynamic shape to give the least resistance to the wind when they are in an open position, are attached to the membranes or screens (2) and (4) by damping arms (6') which are able to turn on their support by the simple action of the wind in order to allow the blocking devices (6) to open and close.

In FIG. 2, the blocking device attached to the membrane or screen (2) is represented in an open position, while the one attached to the membrane or screen (3) is closed.

Figure 3:
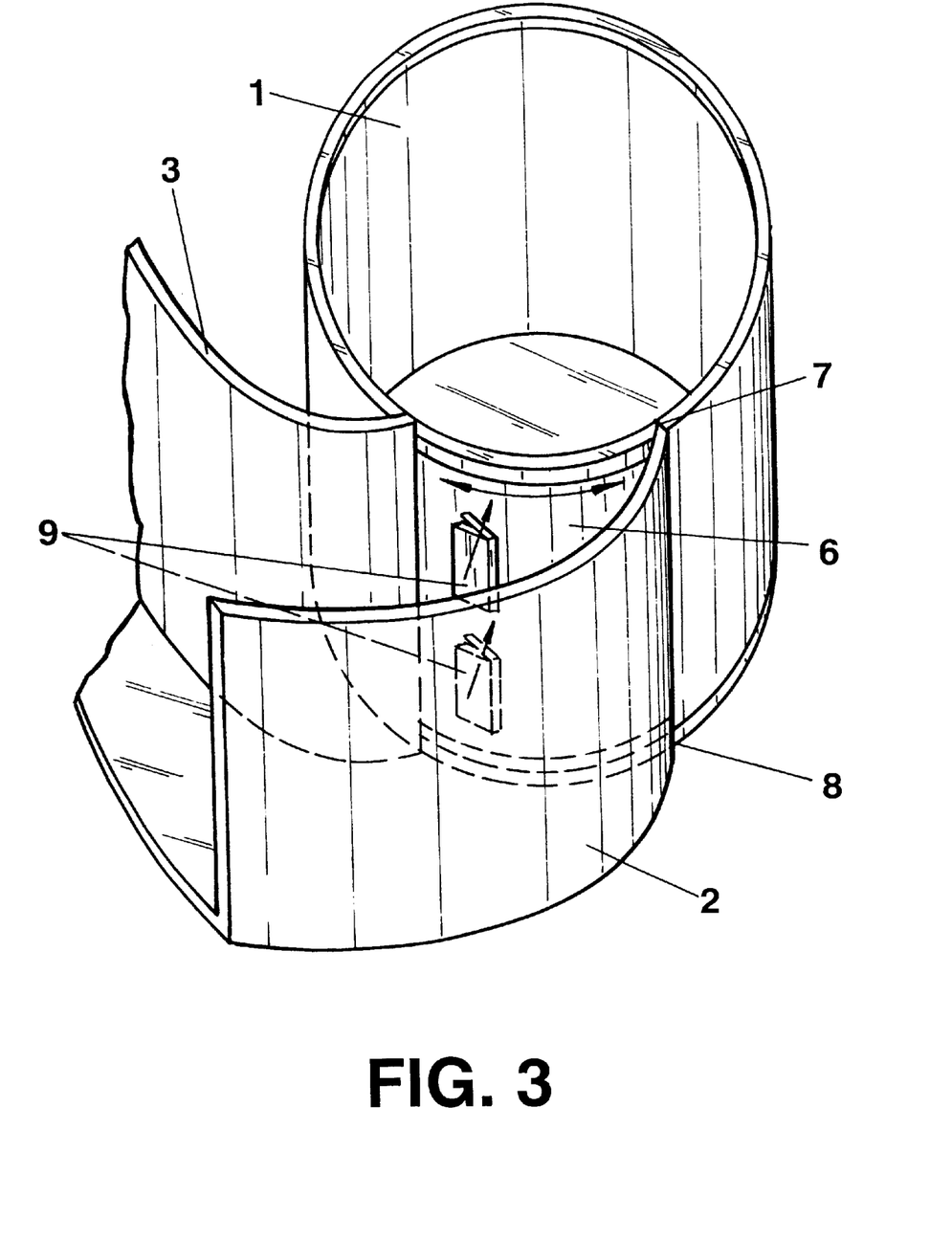
FIG. 3. Is a perspective view of a cross-section of a conversion tower in accordance with the present invention, showing a blocking device in the form of a guiding crown.

With reference to FIG. 3, it may be observed that the blocking device (6) corresponding to a converter in accordance with the present invention, may turn upon the guiding crown of the central vortical duct (1).

This occurs thanks to the configuration of the blocking device (6) in the shape of a guiding crown, which has the same diameter as the circumference of the outside of the central vortical duct (1) corresponding to the specific convector in question.

The blocking devices (6) in accordance with the invention may be only two in number, to close only two convectors to leeward, up to a maximum of five, for a cyclonic or anti-cyclonic conversion tower with five convectors per level.

Although less advantageously, several blocking devices (6) corresponding to the present invention may be combined, represented graphically in FIG. 3 with several conventional blocking devices (6) represented in FIG. 2.

Preferably, and also with reference to FIG. 3, the blocking devices (6) of the invention which may turn on the outer circumference of the central vortical duct (1) do so supported and anchored at the upper part and the lower part of the stiffeners in streamlined rails (7) and (8) provided with rolling elements.

Also preferably, one, several or all the blocking devices (6) corresponding to this invention which can turn upon the outer circumference of the central vortical duct, do so under action of the flow by means of one or more retractable ailerons (9) in the servomotorised blocking device. The blocking devices (6) may be activated by the peripheral vortical flow itself, or by means of an appropriate conventional motorised mechanism (not shown).

Figure 4:
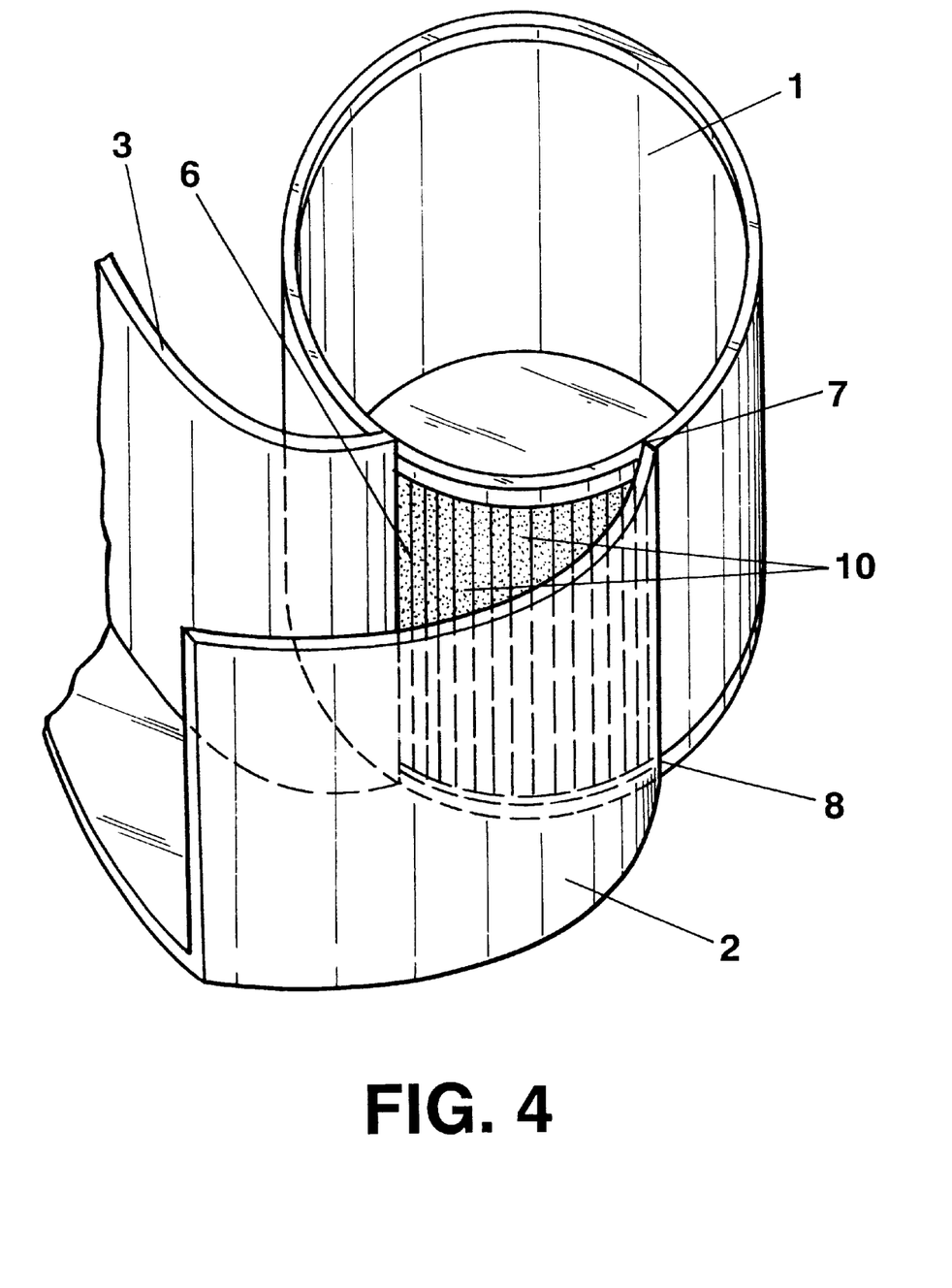
FIG. 4. Corresponds to perspective view of a cross-section of a tower in accordance with the invention, showing a blocking device in the form of a guiding crown with leeward stimulators.

As may be observed in FIG. 4, the blocking devices (6) of the invention may advantageously be provided with leeward stimulators (10) which allow the turning speed of the vortex to be increased.

The leeward stimulators (10) consist of vertical slots which open as a result of the depression produced in the blocking devices (6) to leeward, and thereby a very thin layer of the potential vortex leaves the convector causing the rubbing of the vortical flow against the blocking devices (6) to be reduced to a minimum, and the consequent increase in the turning speed of the vortex.

Figure 5:
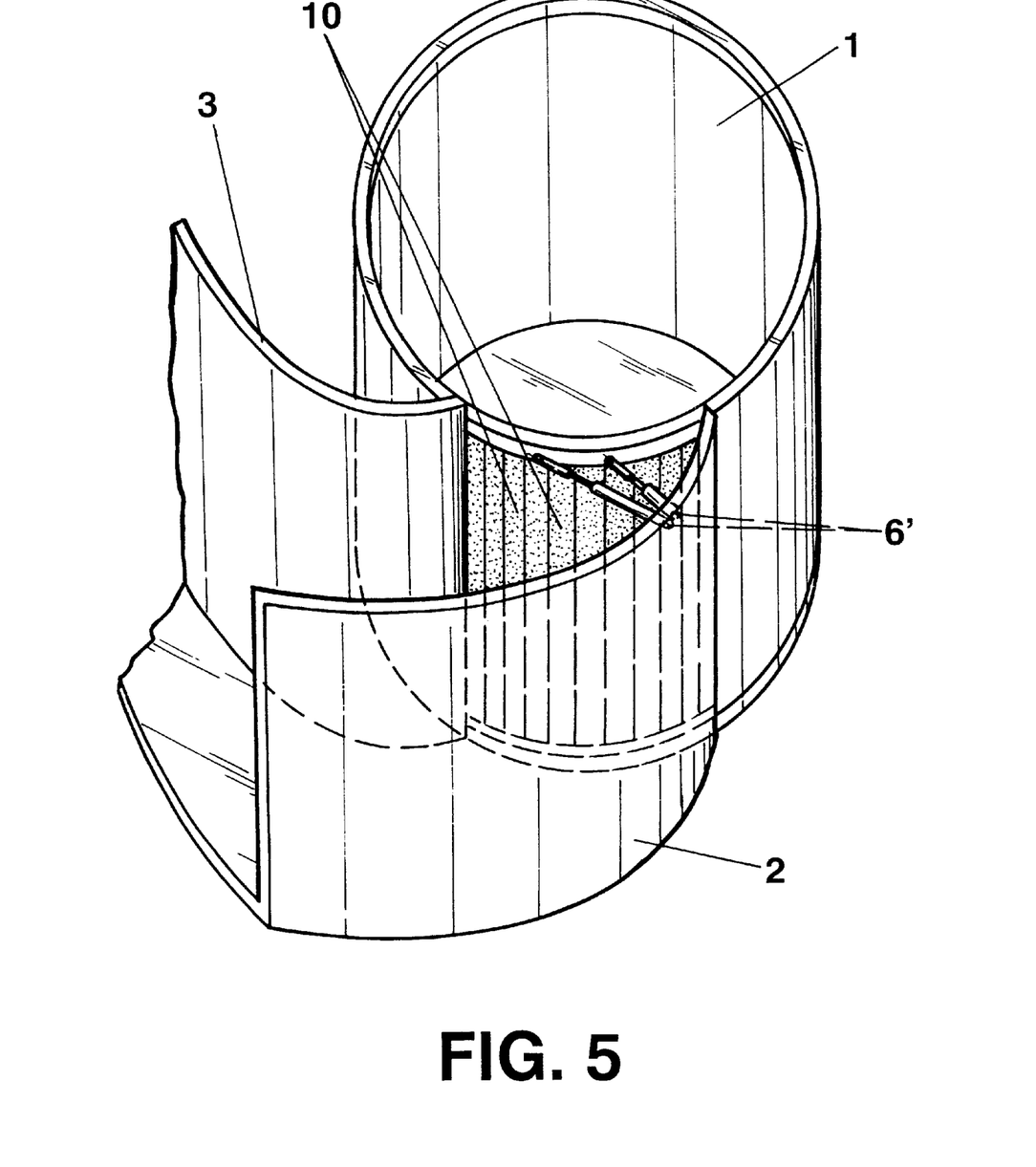
FIG. 5. Is a perspective view of a cross-section of a conventional conversion tower, similar to that represented in FIG. 2, showing a similarly conventional blocking device provided with leeward stimulators.

In fact, and as represented in FIG. 5, identical leeward stimulators (10) may be incorporated in the conventional blocking devices (6) with the same purpose.

Figure 6:
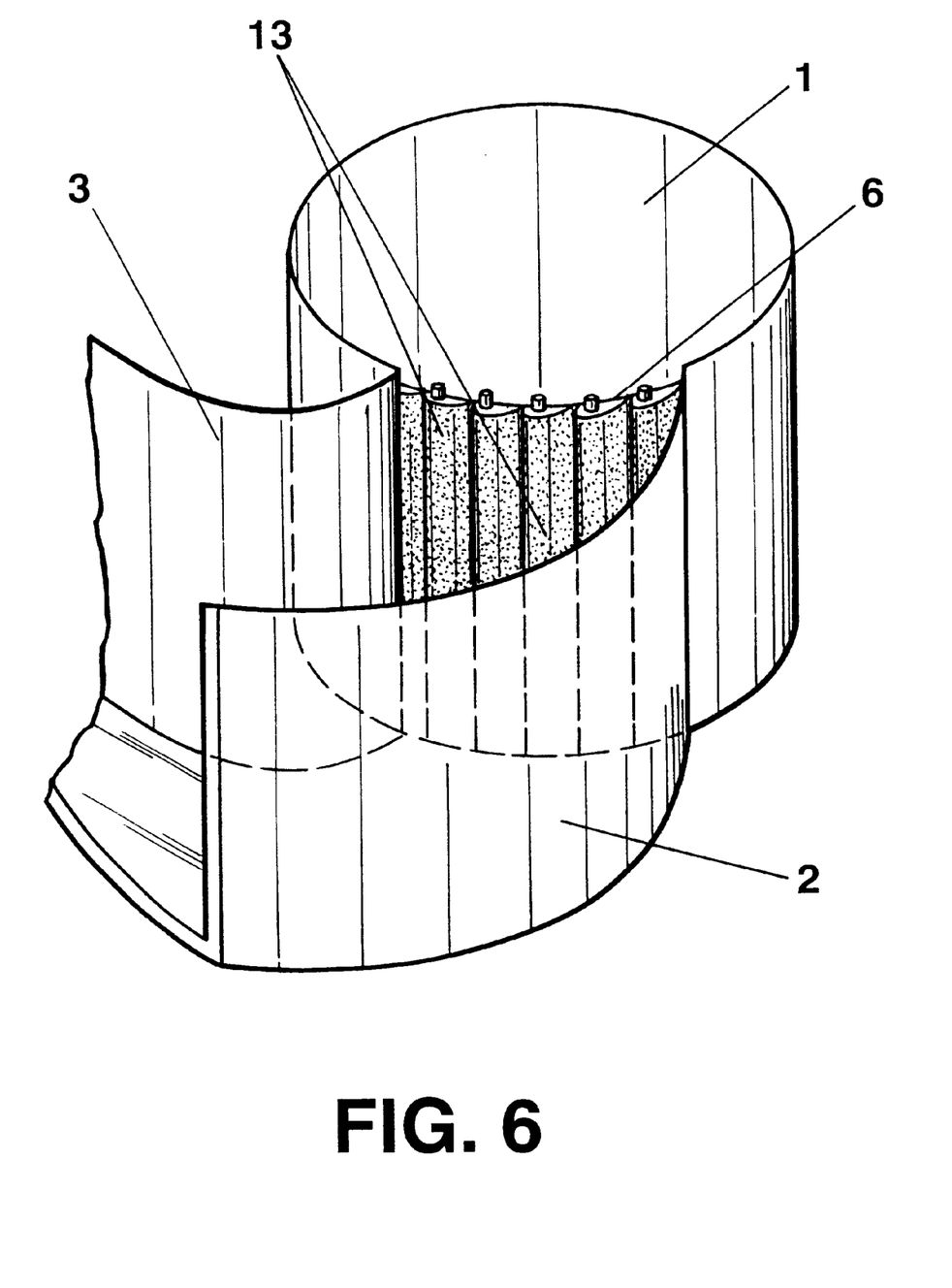
FIG. 6. Represents a perspective view of a cross-section of a conversion tower in accordance with the invention, showing a blocking device in the form of vertical slats.

Alternatively, and as may be seen in FIG. 6, the blocking devices (6) of the invention may be made up of a set of vertical slats (13), preferably with an aerodynamic shape, which may be activated by the convective flow itself or by motorised mechanisms fixed in the upper and lower part of the same.

In this embodiment the leeward stimulators (10) are neither necessary nor useful, since the effect achieved with them on the conventional blocking devices (6) and on the blocking devices (6) in the form of a guiding crown of the present invention, is now obtained by leaving the vertical slats (13) slightly open.

Figure 7:
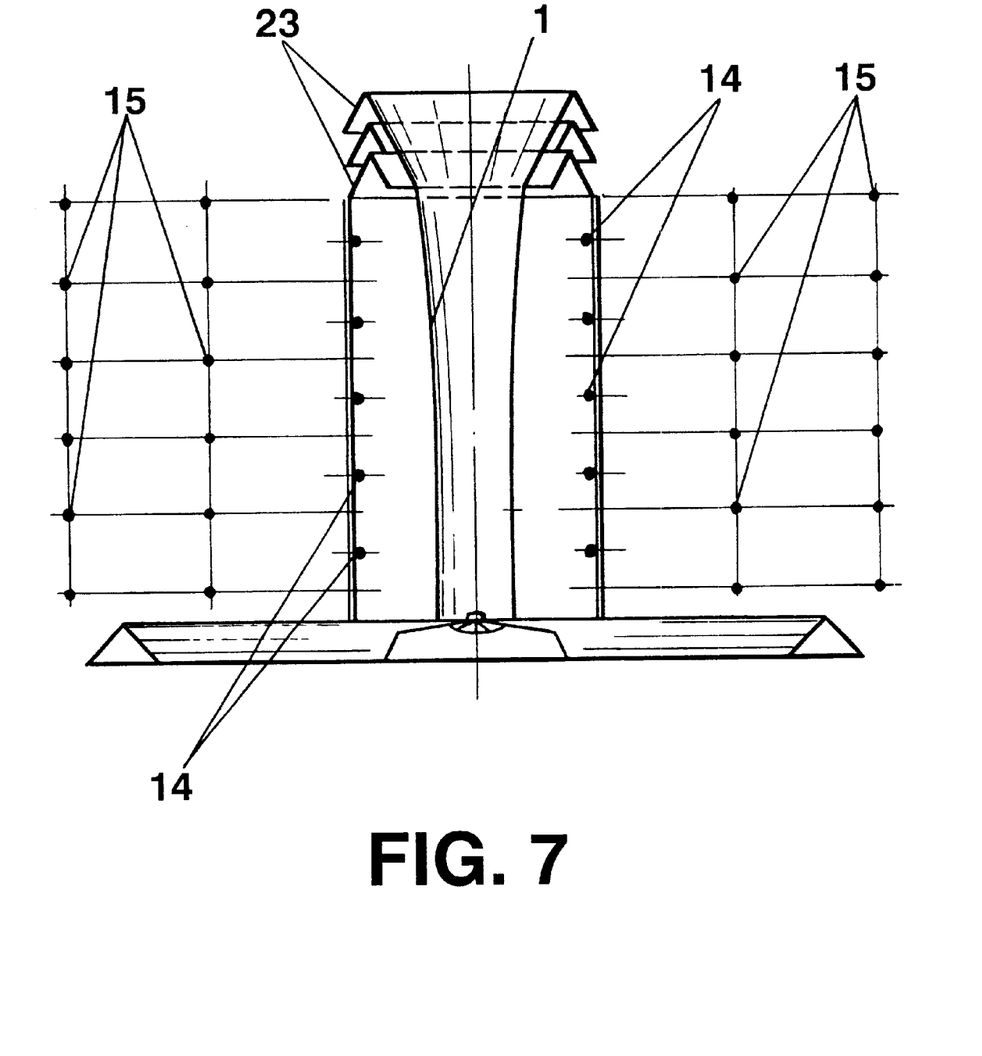
FIG. 7. Represents a perspective view of a conversion tower in accordance with the invention, incorporating sensors on the outside of the conversion tower itself.
Figure 8:
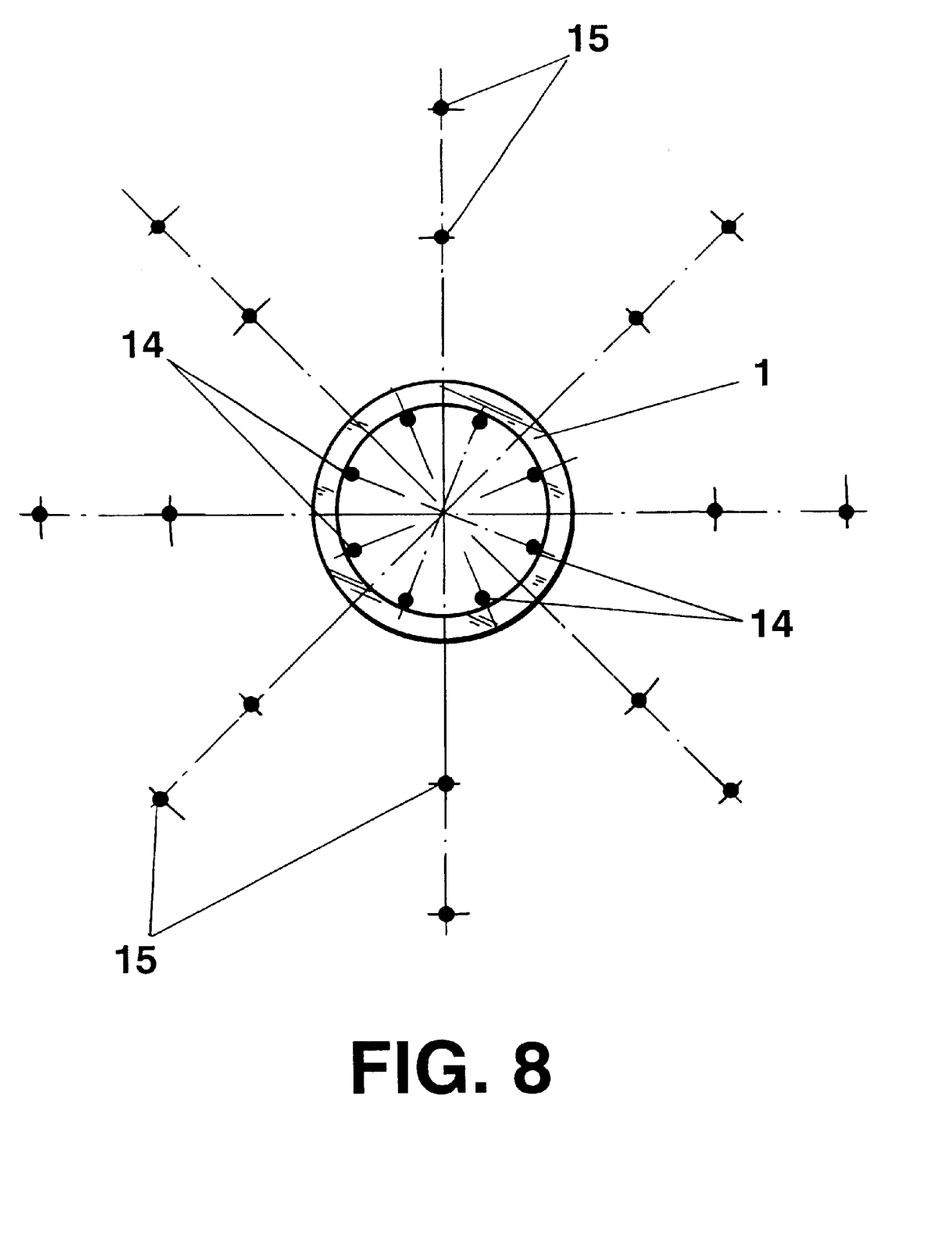
FIG. 8. Shows an upper view of a conversion tower in accordance with the present invention and of its surroundings, showing the placing of the external sensors.

With reference to FIGS. 7 and 8, the inside of the cyclonic or anti-cyclonic conversion tower of the present invention has been advantageously provided with sensors (14) for appropriately controlling, regulating and positioning, by means of servo-mechanisms, one, several or all the blocking devices (6), whether the latter are in the form of a guiding crown or vertical slat (13).

Sensors (15) are also provided for the advanced detection of strength and direction of external wind flows, the sensors being situated radially at different heights and appropriate distances on the outside of the cyclonic or anti-cyclonic conversion tower, and allowing the blocking devices (6) to be appropriately positioned by means of suitable servo-mechanisms.

Figure 9:
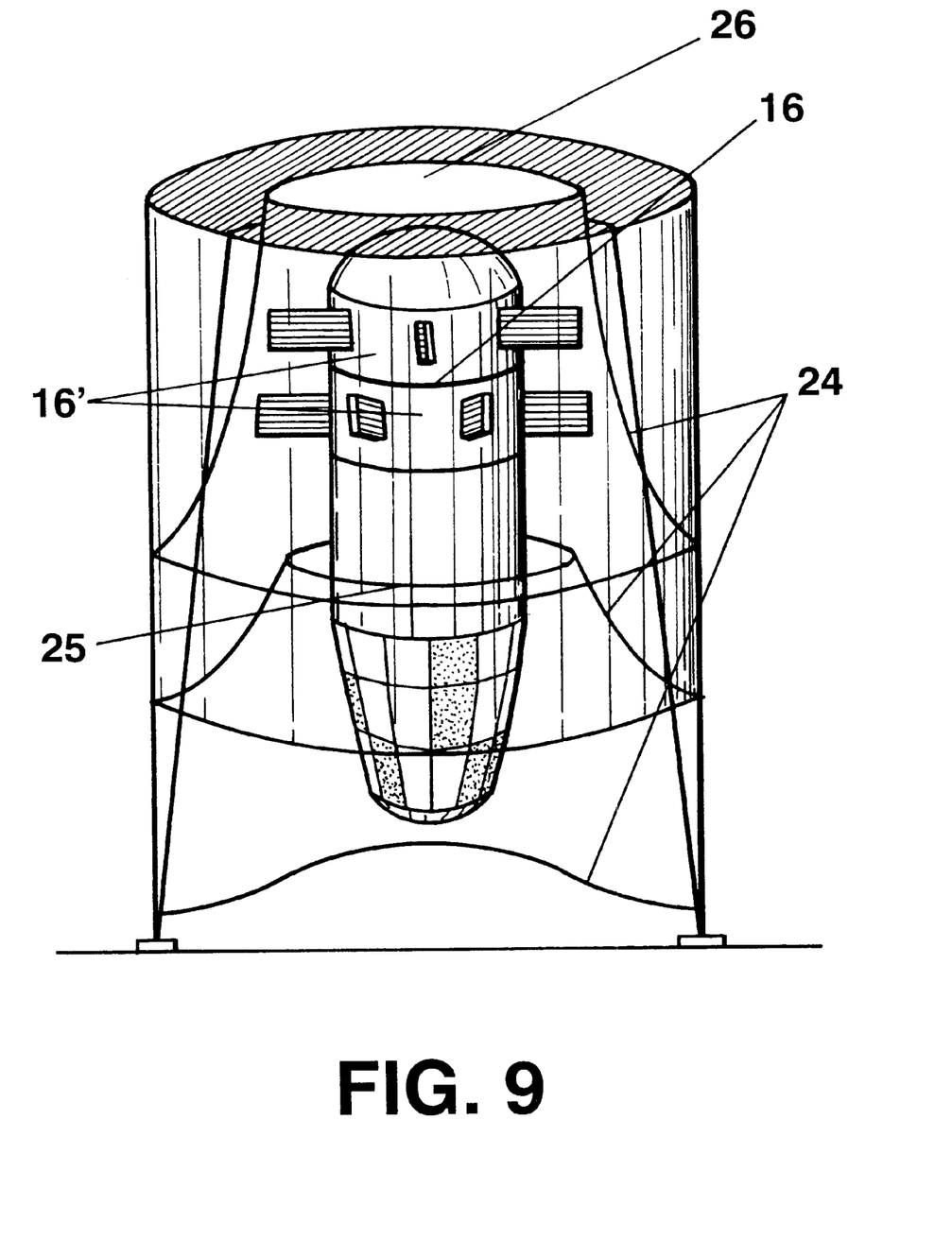
FIG. 9. Represents a perspective view of an aero-turbine, contra-rotating or not, which can be used in a conversion tower in accordance with the present invention, showing the elements which control its blades, the total or partial opening or closing of its diaphragmatic blocking device and the exhaust of the same.

As in conventional cyclonic or anti-cyclonic conversion towers, in a cyclonic or anti-cyclonic conversion tower in accordance with the present invention, the means for converting kinetic energy into electrical energy may be varied (including, without limitation, pumps, generators, compressors, dynamos and alternators), and as shown in FIG. 9, they preferably include at least one aero-turbine (16), contra-rotating or not, provided with elements (16') for controlling its blades, the totally or partially opening or closing its diaphragmatic blocking device (26) and the exhaust of the same, as well as a generator (25) with a control element of the current frequency and its voltage.

Figure 10:
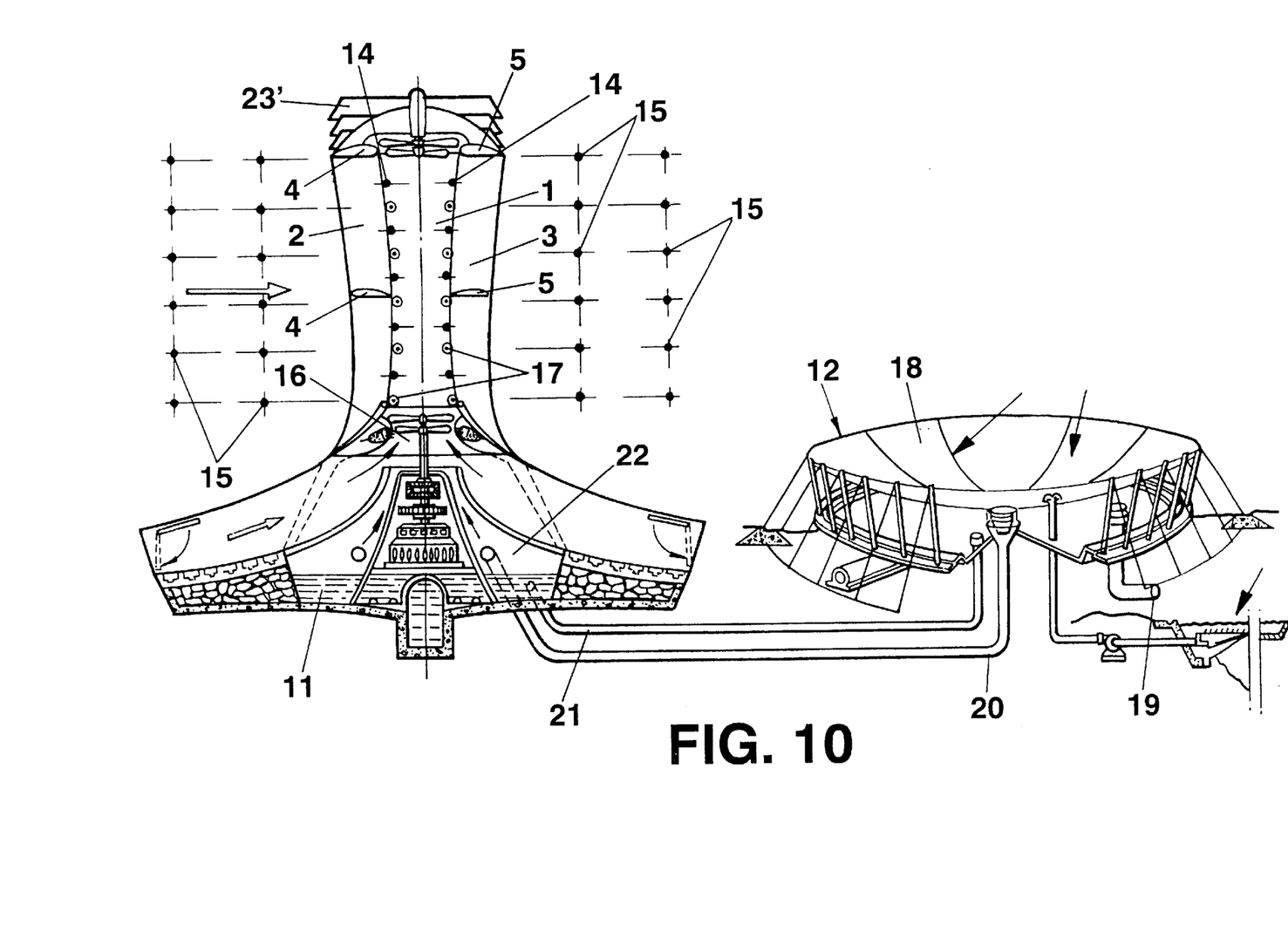
FIG. 10. Corresponds to a diagrammatic view of a conversion tower in accordance with the invention, showing the control and regulation systems of the vortical flows, a hydric hothouse, as well as the sensors of the humidity and air saturation degree.

Preferably, likewise, in the cyclonic or anti-cyclonic conversion towers of the present invention there are elements for controlling and regulating (17) the flows of the vortex, as may be observed in FIG. 10.

optionally, and as may also be seen in FIG. 10, a cyclonic or anti-cyclonic conversion tower of the invention may, as in the case of conventional cyclonic or anti-cyclonic conversion towers, be provided with a base in the form of a tank (11) of hot water and saturated air, which come from at least one pre-evaporator known as "hydric hothouse" (12).

The hydric hothouse (12) is preferably provided with a thermally absorbent black bottom and in any case is covered by a transparent surface (18) and partly filled with water and partly with air gathered from the outside by means of the duct (19), elements which, under the heating effect caused by the action of the sun, generate air with humidity or saturated with water vapour, which is taken to the upper part of the bottom in the form of a tank (11) of the cyclonic or anti-cyclonic conversion tower by means of the duct (20).

The base in the form of a tank (11) is partially filled in turn with water from the hydric hothouse (12) by means of the duct (20), thus creating in the lower part of the cyclonic or anti-cyclonic conversion tower of the present invention thermal conditions similar to those of a natural cyclone, which favour the creation of a vortex.

Preferably, each hydric hothouse (12) is provided with one or more sensors (22) which detect the air humidity level, allowing regulation of the degree of water vapour saturation of the air from the hydric hothouse (12), which penetrates into the cyclonic or anti-cyclonic conversion tower.

Figure 11:
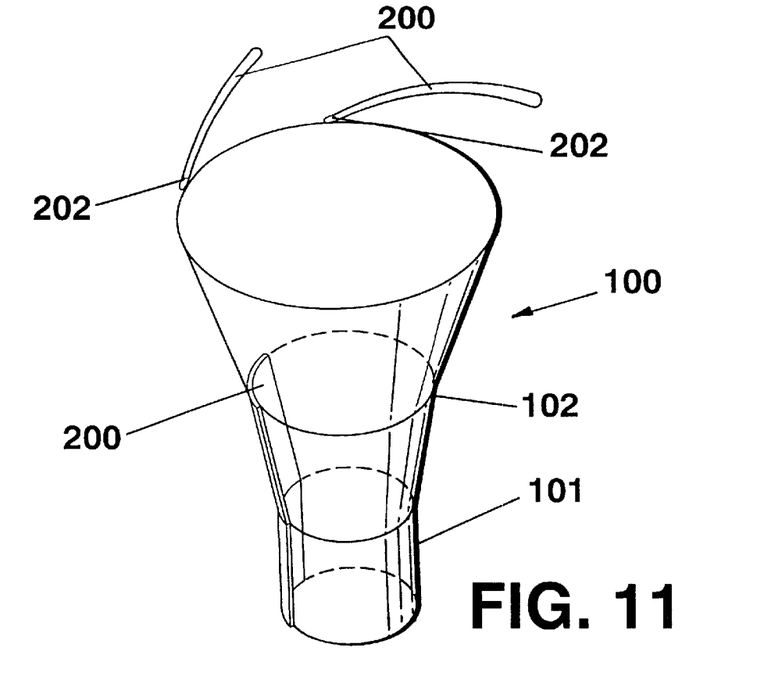
FIG. 11. Represents a possible embodiment of the invention, with the tower adopting a trunco-conical shape in the upper part and the cylindrical shape in the lower part.

In another embodiment of the invention, configured as a collector-concentrator system, the tower itself has a similar shape inside to a hollow cylindrical tower, provided with five curvilinear aerodynamic screens or convectors which collect, conduct and concentrate the laminar flow of the outside wind. It must be pointed out that the cyclonic tower (100) has a lower part (101) which is completely cylindrical, gradually increasing in diameter, that is, in a growing manner until it reaches an inverted trunco-conical shape (102) in its upper part, as shown in FIG. 11. The cyclonic or anti-cyclonic conversion tower (100) is manufactured or constructed in reinforced concrete or another resistant material, with sliding or climbing shutters or by using prefabricated screens with post-stressing, which are separated by aerodynamic rings, sectors or "doughnuts", sections which are separated every two or six metres, in order to provide the structure with great rigidity, these elements being made, as in the case of the tower, of reinforced concrete or other resistant material.

In the upper part of the tower (100) the static deflector-diffuser system is incorporated in order to prevent shearing of the confined cyclone and the deflector is situated in the lower part. Both the static diffuser system and the deflector may be made of pre-stressed concrete or autoxidizable steel.

The invention is able to separate the collector of wind energy from the aeroturbine and in addition to collecting that energy, it is able to concentrate the wind flow.

In the base of the tower (100) and in its axial axis or not, the contra-rotating aeroturbine and the electric generator are installed. It must be indicated that when the humidity degree in the environment is not high, a hothouse is connected with water which collects solar radiation, heats the air and evaporates the water.

Figure 12:
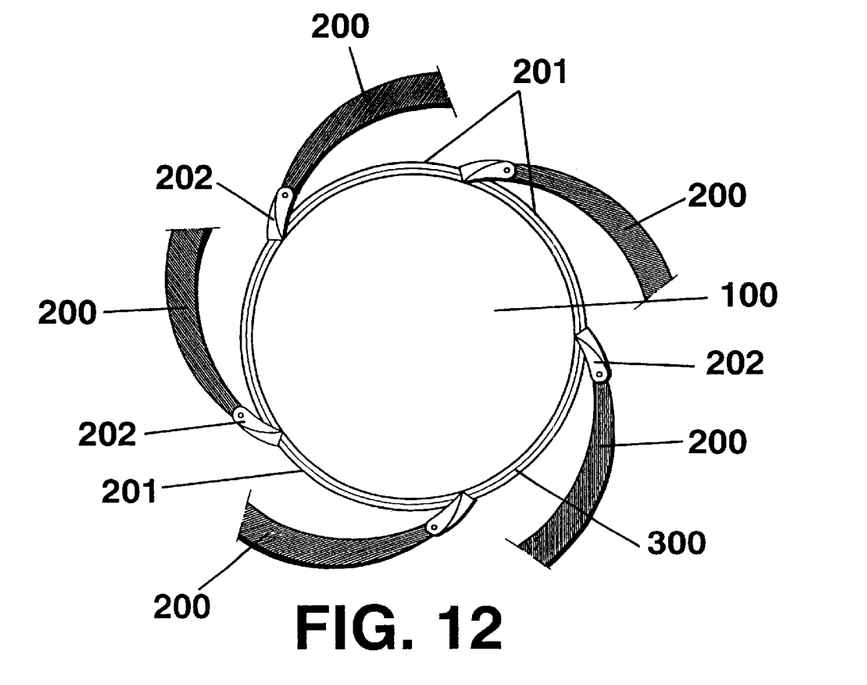
FIG. 12. Represents a plan view of the object shown in FIG. 11, provided with the necessary elements.

Continuing with FIG. 12, it may be observed that on the inner perimeter of the tower (100) or vortical duct there are articulated parts (202) in the final part of the convector (200), which are five in number and surround both the cylindrical area and the trunco-conical area, two of said parts (202) turning inwards when the blocking devices (201) are in that position according to the wind direction; moreover, three of said articulations maintain a tangential position with respect to the vortical duct, being fixed by means of the relevant high-resistance articulations (202) to the upper and lower sectors or "doughnuts".

Figure 13:
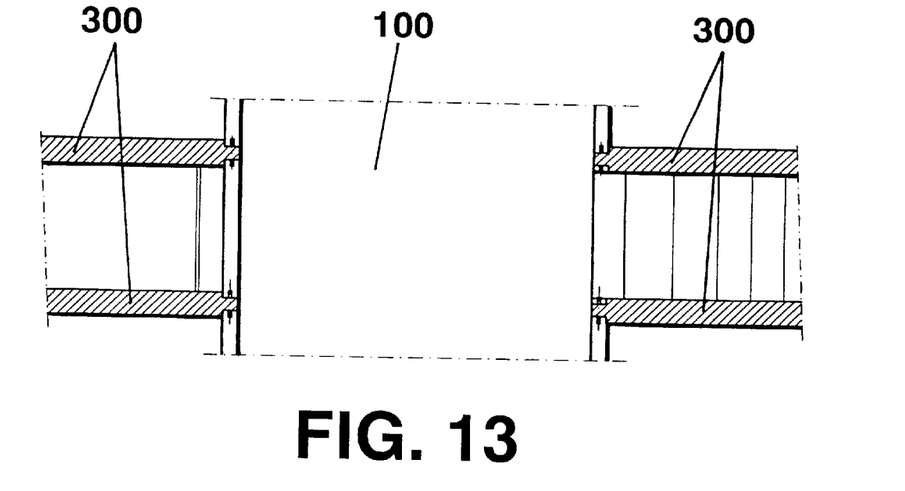
FIG. 13. Corresponds to a front elevation view duly cross-sectioned of the inner fixing areas of the auxiliary elements.
Figure 14:
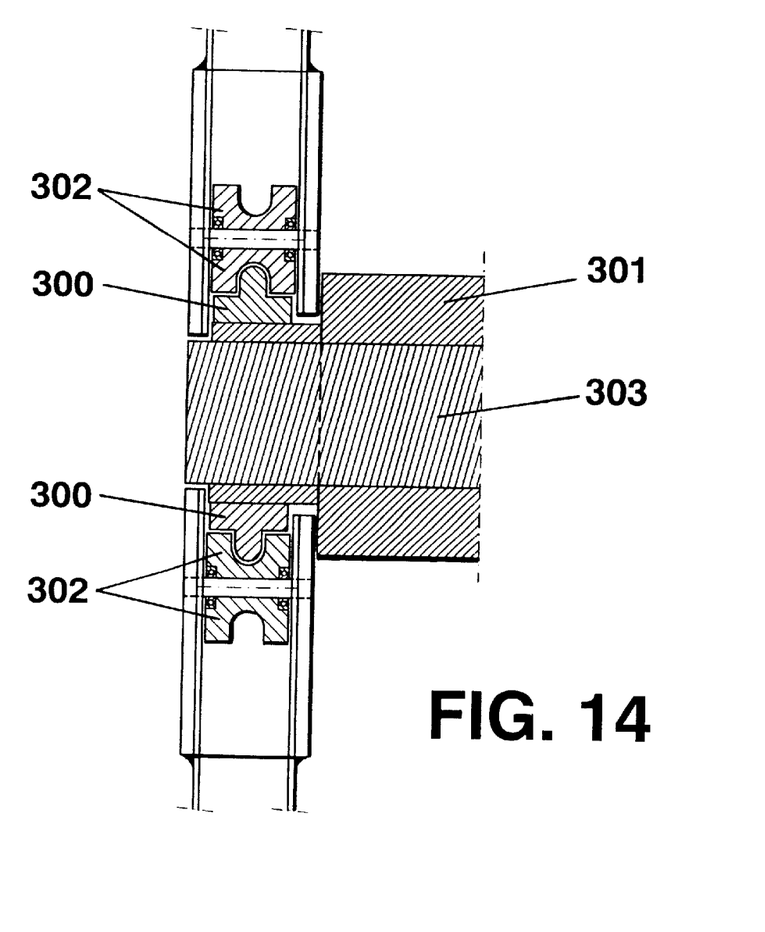
FIG. 14. Finally shows a detail of the means whereby the internal mobile elements are fixed to the rails.

To these upper and lower sectors or "doughnuts" (303) the rails or tracks (300) are fixed, along which channelled wheels (302) of the blocking devices (301) travel.

The invention can be implemented with a servo-motor, logically to aid the moving of the blocking devices which act as opening and closing links to prevent the exit of the turbulent wind from inside the trunco-conical and cylindrical body or the vortical duct (100) to the outside.

The key of the invention consists of the articulated final part (202) made of steel, of the convector (200) made of concrete; it must be indicated that when it reaches the blocking device (201), it retracts outwards to leave the way free for the blocking device.

When the blocking device is not there, the part (202) remains at a tangent to the vortical duct, and thus this duct is completely trunco-conical or cylindrical, stopping the turbulent air.

Finally, it must be pointed out that the parts which surround the inverted trunco-conical configuration have a split trunco-conical surface and the number of parts which surround the area is five.

What is claimed is:

1. A cyclonic or anti-cyclonic conversion tower, which consists of:
    a. a central vortical duct (1);
    b. at least one convector made up of two vertical membranes or screens (2) and (3), generated by a curve and limited on one of their sides by the central vortical duct (1);
    c. at least two stiffeners (4) and (5) per convector;
    d. one blocking device (6) per convector, two per convector or more;
    e. a diffuser (23);
    f. a deflector (24);
    g. means (16) and (25) for converting kinetic wind energy, baric position energy and convective energy, as well as thermal condensation energy into electrical or mechanical energy; and
    h. at least one blocking device (6) which can turn on the outer guiding crown of the central vortical duct (1); characterised in that also one, several or all the blocking devices (6) in the form of a guiding crown which can turn on the outer guiding crown of the central vortical duct (1) do so supported and anchored at the upper and lower part of the stiffeners in circular streamlined rails (7) and (8) and the blocking devices with rolling elements.

2. A cyclonic or anti-cyclonic conversion tower in accordance with claim 1, characterised in that also several or all the blocking devices in the form of a guiding crown (6) which can turn on the outer circumference of the central vortical duct (1) do so under the action of the flow by means of one or more retractable ailerons (9) in the servomotorised blocking device.

3. A cyclonic or anti-cyclonic conversion tower in accordance with claim 1, characterised in that several or all the blocking devices in the form of a guiding crown (6) which can turn on the outer circumference of the central vortical duct (1) do so by means of a motorised mechanism.

4. A cyclonic or anti-cyclonic conversion tower in accordance with claim 1, characterised in that the number of blocking devices (6) is two, three, four or five.

5. A cyclonic or anti-cyclonic conversion tower in accordance with claim 1, characterised in that one, several or all the blocking devices (6) may or may not turn on the outer circumference of the central vortical duct (1), being provided with leeward stimulators (10) consisting of vertical slots which open as a result of the depression produced in the blocking devices (6) to leeward.

6. A cyclonic or anti-cyclonic conversion tower in accordance with claim 1, characterised in that inside said cyclonic or anti-cyclonic conversion tower, it is provided with sensors (14) for appropriately controlling, regulating and positioning one, several or all the blocking devices (6) which can turn on the outer circumference of the central vortical duct (1).

7. A cyclonic or anti-cyclonic conversion tower in accordance with claim 1, characterised in that outside said cyclonic or anti-cyclonic conversion tower, there are sensors (15) for the advanced detection of the strength and direction of wind flows, situated radially at different heights and at adequate distances.

8. A cyclonic or anti-cyclonic conversion tower in accordance with claim 1, characterised in that the means for converting kinetic energy into electrical energy consist of an aero-turbine (16), contra-rotating or not, provided with elements (16') for controlling its blades, the total or partial opening or closing of its diaphragmatic blocking device and the exhaust of the same, as well as a generator.

9. A cyclonic or anti-cyclonic conversion tower in accordance with claim 1, characterised in that it is provided with elements (17) for controlling and regulating the flows of the vortex.

10. A cyclonic or anti-cyclonic conversion tower in accordance with claim 1, characterised in that it comprises a base in the form of a shallow tank (11) of hot water and saturated air, as well as at least one hydric hothouse (12) from which said hot water and said saturated air come.

11. A cyclonic or anti-cyclonic conversion tower in accordance with claim 10, characterised in that it further comprises, in each hydric hothouse (12), one or more sensors (22) which detect the degree of humidity and water vapour saturation of the air.

12. A cyclonic or anti-cyclonic conversion tower, comprising:
    a. a central vortical duct (1);
    b. at least one convector made up of two vertical membranes or screens (2) and (3), generated by a curve and limited on one of their sides by the central vortical duct (1);
    c. at least two stiffeners (4) and (5) per convector;
    d. one blocking device (6) per convector which rests on damping arms which turn around their support on one of the membranes or screens (2) and (3) of the convector;
    e. a diffuser (23);
    f. a deflector (24); and
    g. means (16) and (25) for converting kinetic energy into electrical or mechanical energy, characterised in that one, several or all the blocking devices (6) are provided with leeward stimulators (10), consisting of vertical slots which open as a result of the depression produced in the blocking devices (6) to leeward.

13. A cyclonic or anti-cyclonic conversion tower in accordance with claim 12, characterised in that the number of blocking devices (6) is two, three, four or five.

14. A cyclonic or anti-cyclonic conversion tower, comprising:
  a. a central vortical duct (1);
  b. at least one convector made up of two vertical membranes or screens (2) and (3), generated by a curve and limited on one of their sides by the central vortical duct (1);
  c. at least two stiffeners (4) and (5) per convector;
  d. one blocking device (6) per convector;
  e. a diffuser (23);
  f. a deflector (24); and
  g. means (16) and (25) for converting kinetic energy into electrical or mechanical energy, characterised in that at least one blocking device (6) consists of several vertical slats (13) situated in the outer perimeter of the vortical duct (1), relative to the corresponding convector.

15. A cyclonic or anti-cyclonic conversion tower in accordance with claim 14, characterised in that one, several or all the vertical slats (13) are aerodynamic.

16. A cyclonic or anti-cyclonic conversion tower in accordance with claim 14, characterised in that the vertical slats (13) open under the action of the flow.

17. A cyclonic or anti-cyclonic conversion tower in accordance with claim 15, characterised in that the vertical slats (13) open by means of motorised mechanisms, fixed in the upper and lower part of the corresponding convector (6).

18. A cyclonic or anti-cyclonic conversion tower in accordance with claim 15, characterised in that the slats of the blocking devices are in the entire outer perimeter of the central vortex of all the convectors.

19. A cyclonic or anti-cyclonic conversion tower in accordance with claim 15, characterised in that inside said cyclonic or anti-cyclonic conversion tower sensors (14) are situated for appropriately controlling, regulating and positioning one, several or all the blocking devices (6) which consist of vertical slats (13).

20. A cyclonic or anti-cyclonic conversion tower in accordance with claim 15, characterised in that outside said cyclonic or anti-cyclonic conversion tower, there are sensors (15) for the advanced detection of the strength and direction of wind flows, radially situated at different heights and at adequate and symmetrical distances from the axis of the tower.

21. A cyclonic or anti-cyclonic conversion tower in accordance with claim 15, characterised in that the means for converting kinetic energy into electrical energy consist of an aero-turbine (16), contra-rotating or not, provided with elements (16') for controlling its blades, the total or partial opening or closing of its diaphragmatic blocking device and the exhaust of the same, as well as a generator (25) with electronic elements for regulating the frequency and voltage.

22. A cyclonic or anti-cyclonic conversion tower in accordance with claim 15, characterised in that it is provided with elements (17) for controlling and regulating the flows of the vortex.

23. A cyclonic or anti-cyclonic conversion tower in accordance with claim 15, characterised in that it is provided with a base in the form of a shallow tank (11) of hot water and saturated air, as well as at least one hydric hothouse (12) outside the base, from which said hot water and said saturated air come.

24. A cyclonic or anti-cyclonic conversion tower in accordance with claim 23, characterised in that in each hydric hothouse (12) it further comprises one or more sensors (22), which detect the degree of humidity and water vapour saturation of the air.

25. A cyclonic or anti-cyclonic conversion tower in accordance with claim 14, of the type made up of a static collector-concentrator system, a static diffuser-deflector system, an electric aeroturbine-generator system, and a hothouse system, and of the type configured as a cylindrical tower, hollow inside, provided with five curvilinear aerodynamic screens which collect, conduct and concentrate the laminar flow of the outside wind, being built of reinforced concrete with sliding or climbing shutters, or with prefabricated, post-stressed screens, separated by aerodynamic rings, sectors or "doughnuts", which make the structure rigid and which are made of reinforced concrete, there being in the upper part of the tower a diffuser which prevents shearing of the confined cyclone and in the lower part a deflector, characterised in that the body of the tower (100) adopts a cylindrical shape in its lower part, while in its upper part it has an inverted trunco-conical shape, deriving from the gradual growth of the diameter of the cylindrical area (101), until it reaches the inverted trunco-conical shape (102) in the upper part. The diffuser, in the upper part and the deflector in the lower part are made of reinforced or pre-stressed concrete or autoxidizable steel, having the possibility of separating the collector of wind energy from the aeroturbine, concentrating the wind flow and having, at the base of the tower (100) and in its axial axis or not, a contra-rotating aeroturbine and the electric generator. Also, a hothouse with water can be connected to the lower part, and, in the perimeter of the tower, in its cylindrical area and in its trunco-conical area, there are five screens (200) with a curvilinear shape in accordance with the outer perimeter of the tower, which have a curvature of 72°.

26. A cyclonic or anti-cyclonic conversion tower in accordance with claim 25, characterised in that the final part (202) of the convector (200) is articulated (202).

27. A cyclonic or anti-cyclonic conversion tower in accordance with claim 25, characterised in that the two blocking devices per section in the trunco-conical area have a shape that conforms with the structure, specifically, the inverted trunco-conical surface shape.

* * * * *

UNITED STATES PATENT AND TRADEMARK OFFICE
CERTIFICATE OF CORRECTION

PATENT NO. : 6,590,300 B1
DATED : July 8, 2003
INVENTOR(S) : Francisco Javier Prieto Santiago It is certified that error appears in the above-identified patent and that said Letters Patent is hereby corrected as shown below:

<u>Title page,</u>
Item [75], should read:
-- [75] Inventor: Francisco Javier Prieto Santiago, Algete (ES) --

Signed and Sealed this

Twentieth Day of January, 2004

JON W. DUDAS
*Acting Director of the United States Patent and Trademark Office*